United States Patent
Swix et al.

(10) Patent No.: US 9,712,883 B2
(45) Date of Patent: *Jul. 18, 2017

(54) METHODS AND SYSTEMS FOR PROVIDING INFORMATION ABOUT PROGRAMS AVAILABLE FOR VIEWING

(71) Applicant: AT&T Intellectual Property I, L.P., Atlanta, GA (US)

(72) Inventors: Scott R. Swix, Duluth, GA (US); John Stefanik, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,844

(22) Filed: Apr. 25, 2014

(65) Prior Publication Data

US 2015/0020108 A1    Jan. 15, 2015

Related U.S. Application Data

(60) Continuation of application No. 13/615,963, filed on Sep. 14, 2012, now Pat. No. 8,739,220, and a
(Continued)

(51) Int. Cl.
| | | |
|---|---|---|
| H04N 21/482 | (2011.01) | |
| H04N 5/445 | (2011.01) | |
| H04N 21/475 | (2011.01) | |

(52) U.S. Cl.
CPC ..... *H04N 21/4821* (2013.01); *H04N 5/44543* (2013.01); *H04N 21/4755* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 4,706,121 A | 11/1987 | Young | |
| 4,847,825 A | 7/1989 | Levine | |

(Continued)

FOREIGN PATENT DOCUMENTS

| | | |
|---|---|---|
| EP | 0834798 A2 | 4/1998 |
| EP | 0854645 A2 | 7/1998 |

(Continued)

OTHER PUBLICATIONS

PCT/US99/20924 Written Opinion, International Preliminary Examining Authority, Aug. 17, 2000.

*Primary Examiner* — Pankaj Kumar
*Assistant Examiner* — Charles N Hicks
(74) *Attorney, Agent, or Firm* — Cantor Colburn LLP

(57) ABSTRACT

A user interface is presented on a monitor of a media device for providing information about available programs. The user interface includes an array having three columns (channel, current show, and next show) with commonly aligned rows. Each row of the channel column includes an indicator. Each row of the current show column includes a title naming a program currently available on a channel of the media device corresponding to the indicator in a commonly aligned row of the channel column. Each row of the next show column includes a title naming a show available after the current program on the same channel. The currently available program may be displayed on the monitor in response to a viewer selected row, indicator, and/or title in the array.

20 Claims, 7 Drawing Sheets

| CHANNEL | START TIME | CURRENT SHOW | START TIME | NEXT SHOW |
|---|---|---|---|---|
| 2-NBC | 10:00AM | BATMAN | 11:00AM | SPIDERMAN |
| 3-CBS | 9:30AM | HOME FINANCE | 10:30AM | HOME REPAIR |
| 4-ABC | 10:05AM | SPECIAL REPORT: RUSSIA | 10:30AM | TODAY IN HISTORY |
| 5-FOX | 10:00AM | AS THE WORLD TURNS | 10:30AM | DYNASTY |
| 6-CNN | 10:15AM | HEADLINES | 10:45AM | SPORTS HIGHLIGHTS |
| 7-ESPN | 10:00AM | NASCAR HEROES | 10:30AM | X500 NASCAR PRE-RACE SHOW |
| 8-CSPAN | 10:00AM | CONGRESS | 11:00AM | SENATE |
| 9-MTV | 9:30AM | VIDEOS | 10:30AM | STARSLIVE |
| 10-HBO | 10:05AM | ROCKY XX | 12:35PM | STAR WARS XX |
| 11-SHOW | 10:00AM | TERMINATOR V | 12:30PM | TERMINATOR V |

Related U.S. Application Data continuation of application No. 12/633,945, filed on Dec. 9, 2009, now Pat. No. 8,291,450, and a continuation of application No. 10/271,430, filed on Oct. 16, 2002, now Pat. No. 7,650,618, and a division of application No. 09/393,113, filed on Sep. 10, 1999, now Pat. No. 6,499,138.

(60) Provisional application No. 60/099,735, filed on Sep. 10, 1998.

(56) References Cited

U.S. PATENT DOCUMENTS

| | | | |
|---|---|---|---|
| 4,908,713 A | 3/1990 | Levine | |
| 4,963,994 A | 10/1990 | Levine | |
| 4,977,455 A | 12/1990 | Young | |
| 5,123,046 A | 6/1992 | Levine | |
| 5,151,789 A | 9/1992 | Young | |
| 5,297,204 A | 3/1994 | Levine | |
| 5,307,173 A | 4/1994 | Yuen et al. | |
| 5,335,079 A | 8/1994 | Yuen et al. | |
| 5,365,282 A | 11/1994 | Levine | |
| 5,373,330 A | 12/1994 | Levine | |
| 5,414,756 A | 5/1995 | Levine | |
| 5,420,647 A | 5/1995 | Levine | |
| 5,475,382 A | 12/1995 | Yuen et al. | |
| 5,508,815 A | 4/1996 | Levine | |
| 5,515,173 A | 5/1996 | Mankovitz et al. | |
| 5,532,732 A | 7/1996 | Yuen et al. | |
| 5,532,754 A | 7/1996 | Young et al. | |
| 5,539,391 A | 7/1996 | Yuen | |
| 5,552,837 A | 9/1996 | Mankovitz | |
| 5,553,123 A | 9/1996 | Chan et al. | |
| 5,559,550 A | 9/1996 | Mankovitz | |
| 5,568,272 A | 10/1996 | Levine | |
| 5,585,866 A | 12/1996 | Miller et al. | |
| 5,592,551 A | 1/1997 | Lett et al. | |
| 5,619,383 A | 4/1997 | Ngai | |
| 5,640,484 A | 6/1997 | Mankovitz | |
| 5,673,089 A | 9/1997 | Yuen et al. | |
| 5,781,246 A | 7/1998 | Alten et al. | |
| 5,809,204 A | 9/1998 | Young et al. | |
| 5,822,123 A | 10/1998 | Davis et al. | |
| 5,828,420 A | 10/1998 | Marshall et al. | |
| 5,929,932 A | 7/1999 | Otsuki et al. | |
| 6,018,372 A | 1/2000 | Etheredge | |
| 6,111,614 A | 8/2000 | Mugura et al. | |
| 6,499,138 B1 * | 12/2002 | Swix et al. | 725/38 |
| 6,687,906 B1 | 2/2004 | Yuen et al. | |
| 6,701,526 B1 | 3/2004 | Trovato | |
| 8,291,450 B2 * | 10/2012 | Swix et al. | 725/39 |
| 2007/0124795 A1 | 5/2007 | McKissick et al. | |
| 2008/0178223 A1 | 7/2008 | Kwoh et al. | |

FOREIGN PATENT DOCUMENTS

| | | |
|---|---|---|
| WO | 9204801 | 3/1992 |
| WO | 9641478 | 12/1996 |
| WO | 9748230 | 12/1997 |

* cited by examiner

| CHANNEL | START TIME | CURRENT SHOW | START TIME | NEXT SHOW |
|---|---|---|---|---|
| 2-NBC | 10:00AM | BATMAN | 11:00AM | SPIDERMAN |
| 3-CBS | 9:30AM | HOME FINANCE | 10:30AM | HOME REPAIR |
| 4-ABC | 10:05AM | SPECIAL REPORT: RUSSIA | 10:30AM | TODAY IN HISTORY |
| 5-FOX | 10:00AM | AS THE WORLD TURNS | 10:30AM | DYNASTY |
| 6-CNN | 10:15AM | HEADLINES | 10:45AM | SPORTS HIGHLIGHTS |
| 7-ESPN | 10:00AM | NASCAR HEROES | 10:30AM | X500 NASCAR PRE-RACE SHOW |
| 8-CSPAN | 10:00AM | CONGRESS | 11:00AM | SENATE |
| 9-MTV | 9:30AM | VIDEOS | 10:30AM | STARSLIVE |
| 10-HBO | 10:05AM | ROCKY XX | 12:35PM | STAR WARS XX |
| 11-SHOW | 10:00AM | TERMINATOR V | 12:30PM | TERMINATOR V |

FIG. 1

| CHANNEL | 10:00AM-10:30AM | 10:30AM-11:00AM | 11:00AM-11:30AM | 11:30AM-12:00PM |
|---|---|---|---|---|
| 2-NBC | BATMAN | BATMAN | SPIDERMAN | AVENGERS |
| 3-CBS | HOME FINANCE | HOME REPAIR | HOME DECORATING | HOME FOR HOLIDAYS |
| 4-ABC | SPECIAL REPORT: RUSSIA | TODAY IN HISTORY | FUTURE 2000 | WORLD REVIEW |
| 5-FOX | AS THE WORLD TURNS | DYNASTY | DALLAS | MELROSE PLACE |
| 6-CNN | HEADLINES | SPORTS HIGHLIGHTS | DC UPDATE | BUSINESS REVIEW |
| 7-ESPN | NASCAR HEROES | X500 NASCAR | X500 NASCAR | X500 NASCAR |
| 8-CSPAN | CONGRESS | CONGRESS | SENATE | HEARINGS |
| 9-MTV | VIDEOS | STARSLIVE | VIDEOS | DEADSTARS |
| 10-HBO | ROCKY XX | ROCKY XX | ROCKY XX | ROCKY XX |
| 11-SHOW | TERMINATOR V | TERMINATOR V | TERMINATOR V | TERMINATOR V |

FIG. 2

| CHANNEL | START TIME | CURRENT SHOW | START TIME | NEXT SHOW |
|---|---|---|---|---|
| 6-GNN | 10:15AM | HEADLINES | 10:45AM | SPORTS HIGHLIGHTS |
| 7-ESPN | 10:00AM | NASCAR HEROES | 10:30AM | X500 NASCAR PRE-RACE SHOW |
| 8-CSPAN | 10:00AM | CONGRESS | 11:00AM | SENATE |
| 9-MTV | 9:30AM | VIDEOS | 10:30AM | STARSLIVE |
| 10-HBO | 10:05AM | ROCKY XX | 12:35PM | STAR WARS XX |
| 11-SHOW | 10:00AM | TERMINATOR V | 10:30PM | TERMINATOR V |

FIG. 4

METHODS AND SYSTEMS FOR PROVIDING
INFORMATION ABOUT PROGRAMS
AVAILABLE FOR VIEWING

CROSS-REFERENCE TO RELATED
APPLICATIONS

This application is a continuation of U.S. patent application Ser. No. 13/615,963 filed Sep. 14, 2012, the contents of which are incorporated herein by reference in their entirety which is a continuation of U.S. patent application Ser. No. 12/633,945 filed Dec. 9, 2009, now U.S. Pat. No. 8,291,450, the contents of which are incorporated herein by reference in their entirety which is a continuation of U.S. patent application Ser. No. 10/271,430 filed Oct. 16, 2002, now U.S. Pat. No. 7,650,618, the contents of which are incorporated herein by reference in their entirety, which is a divisional of U.S. patent application Ser. No. 09/393,113 filed Sep. 10, 1999, now U.S. Pat. No. 6,499,138, the contents of which are incorporated herein by reference in their entirety, which claims the benefit of U.S. Provisional Patent Application Ser. No. 60/099,735, filed Sep. 10, 1998, the contents of which are incorporated herein by reference in their entirety.

FIELD OF THE INVENTIONS

The present inventions relate to television and other media that present programs for viewing, and particularly relate to user interfaces for the display and the selection of programs for viewing.

BACKGROUND

Newspapers and other paper publications conveniently print guides to the programs available for viewing on television. But a newspaper or other paper publication may not always be available to a viewer when the viewer decides to watch some television. For convenience, cable companies typically display a guide to the programming they offer on a dedicated channel of the cable service. In addition to convenience, the guide may be provided by the cable company as a vehicle to carry advertising, and thus, provide additional revenue to the cable company. A viewer may tune his or her television to the channel carrying the guide and review the programming information to choose a program to watch. Such a guide on a television monitor may be referred to as a channel guide, program guide, electronic guide, electronic television guide, electronic programming guide (EPG), a user interface, program schedule, or by similar terms. Generally, herein the term "user interface" is used with respect to the present inventions.

Electronic programming guides are generally known. Examples of electronic programming guides are described in the patent to Mankovitz, U.S. Pat. No. 5,559,550, entitled "Apparatus and Methods for Synchronizing a Clock to a Network Clock," as well as in other publicly available documents. Information regarding the extraction of a program schedule from a signal provided to a television so as to create a user interface may be obtained from the patent to Mankovitz, U.S. Pat. No. 5,640,484, entitled "Switch for Automatic Selection of Television Signal Sources for Delivery of Television Guide Data."

In addition to television, electronic programming guides may be used in other environments. For example, an electronic programming guide may be useful in the context of the global information network (Internet) or other computer or data networks. Some of these networks offer multiple programs available for selection by a viewer to read, to watch, to use, to interact with, etc. To gain information about the available programs and to make a selection, the viewer may use an electronic programming guide that is displayed on a computer monitor or similar device used by the viewer. Televisions, computers, networked computers, and the like are referred to herein generally as "media devices".

When using an electronic programming guide, a viewer typically is interested in information including: (1) the channel or other locator of an available program; (2) the temporal characteristics of an available program such as start time, duration, end time, current availability, etc.; and (3) the name, title, or other identifier of an available program. Also, a viewer may be interested in gaining information about the availability of programs of a particular type or related to a specific or specialty topic. For example, a viewer may be interested in knowing whether any sports programs are available, and particularly, whether any baseball games are available for viewing.

In addition, a viewer may be interested in knowing the available programming during a certain time slot or interval. For example, a viewer may have a choice with respect to scheduling time for television or other media use. Thus, the viewer may not necessarily be interested in the current or other near term programming available. Rather, the viewer is interested in knowing what programming is available when the viewer is likely to schedule his or her television or other media break. Based on a review of the available programming during any particular time slot, the viewer may decide to plan to take the television break at the initially selected time, or reschedule the break for a time when more interesting programming to the viewer is available.

Accordingly, there is a need for an electronic programming guide that provides a viewer with information such as: (1) the channel or other locator of an available program; (2) the temporal characteristics of an available program such as start time, duration, end time, current availability, etc.; and/or (3) the name, title, or other identifier of an available program. There is also a need for an electronic programming guide that provides a viewer with information about the availability of programs of a particular type or related to a specific or specialty topic. In addition, there is a need for an electronic programming guide that provides a viewer with information as to the available programming during a certain time slot or interval as selected by the viewer.

SUMMARY

Stated generally, the present inventions include methods, systems, and user interfaces for presenting information related to available programming to a viewer and/or other user. An exemplary user interface is presented on a monitor of a media device (such as television screen or computer screen). The exemplary user interface provides information as to the channels (or other location indicator), titles, and/or time characteristics of available programming.

Advantageously, the viewer may interact with the user interface so as to have a selected portion or portions of the user interface highlighted for clearer viewing or for other reasons. For example, the viewer may select a topic from a list of topics, and have a program or all programs related to the topic highlighted on the user interface. Further, the viewer may hone his or her programming selection by first selecting a general topic from the list of topics, and then further selecting a specialty topic from a specialty topic list that is related to the general topic selected by the viewer. The program or programs related to the specialty topic may be highlighted on the user interface. The viewer also may interact with the user interface so as to select programming (from the highlighted programs on the user interface or in other ways) and have the programming displayed on the monitor of the media device.

In addition, the viewer may interact with an exemplary user interface by designating a time period or time slot in which the viewer is interested. In response to the designation of a time period, the user interface may provide information such as channel (or other locator), title, and/or time characteristics of programming available during the designated time period. Advantageously, the viewer may change the time period. In response to the change, the user interface may change the information provided so as to accurately reflect the programming available during the changed, designated time period. Further, the viewer may interact with the user interface so as to choose a program available during the designated time period and have the program displayed on the monitor of the media device.

Particularly described, the exemplary embodiments of the present inventions provide user interfaces for presentation on a monitor of a media device. An exemplary user interface may include a topic list having topic entries such as "local news", "national news", "world news", "all sports", and the like. In addition, a topic entry may include or correspond to a specialty topic list. The specialty topic list may include specialty topic entries related to the topic entry. For example, a topic entry may be "all sports." This topic entry may include a specialty topic list with the following specialty topic entries: "baseball"; "basketball", "football", and the like. Thus, the viewer may select a topic entry such as "all sports" from the topic list. In response, the specialty topic list corresponding to the selected topic entry may be displayed, and using the "all sports" topic entry, the specialty topic list may include the following specialty topic entries: "baseball"; "basketball", and "football. Further, a specialty topic entry may be selected as an elected specialty topic entry and that elected specialty topic entry may be highlighted on the user interface.

In addition to the topic list and the specialty topic list, an exemplary user interface may include an array with programming information. Of course, the array with programming information may be displayed before or after display of the topic list and the specialty topic list.

An exemplary array with programming information includes three columns (channel, current show, and next show) with commonly aligned rows. Each row of the channel column includes a channel indicator. Each row of the current show column includes a current show title naming a program available for viewing at the current time on a channel of the media device corresponding to the channel indicator in a commonly aligned row in the channel column. Each row of the current show column also may include a start time for the program available for viewing at the current time. Each row of the next show column includes a next show title naming a show available for viewing after the program available for viewing at the current time on the channel of the media device corresponding to the channel indicator in the commonly aligned row in the channel column. Each row of the next show column also may include a start time for the program available as the next show after the current show.

Advantageously, the array of this exemplary user interface provides a viewer with information as to the current programs available (i.e., programs in progress) on the available channels, and as to the next show available on any of these channels.

In addition, the array of this exemplary user interface allows for a row, a channel indicator, or a current show title to be selected by a viewer, and if selected, to be highlighted. In addition, the viewer may provide an indication that the program available for view at the current time and corresponding to the selected (and perhaps highlighted) row, channel indicator, or current show title may be displayed on the monitor of the media device.

Further, the exemplary array may interact with the topic list and the specialty topic list discussed above. For example, the array may respond to the selection of a selected topic entry or to the election of an elected specialty topic entry. In particular, the response may be the highlighting in the array of a program having a topic in common with the selected topic entry and/or with the elected specialty topic entry. Further, the array may be operative to receive an indication from the viewer to view the program having the topic in common with the selected topic entry and/or with the elected specialty topic entry. The array then may cause the program to be displayed on the monitor of the media device.

Advantageously, the present inventions include another exemplary user interface. This exemplary user interface includes a time slot and an array. The time slot provides for the display of a time period as may be selected by the viewer. The array includes two columns (channel and program) having commonly aligned rows. Each row of the channel column includes a channel indicator. Each row of the program column includes a program title naming a program available for viewing during the selected time period on a channel of the media device corresponding to the channel indicator in a commonly aligned row in the channel column.

This exemplary user interface allows a viewer to select a time period, and then, to view the programming that is available on the available channels during that selected time period.

This exemplary user interface allows a viewer to change the time period in the time slot. If the time period is changed, then the program title in each row of the program column may change to a different program title naming a different program available for viewing during the different selected time period. Of course, a program title in a particular row may not appear to the viewer to change if the same program is available during the different selected time period as well as the originally selected time period.

Further in this exemplary user interface, the array may be receptive to a selection by the viewer of a selected row, a selected channel indicator, or a selected program title. In response, the selected row, the selected channel indicator, or the selected program title may be highlighted. Further, the program corresponding to the selected row, the selected channel indicator, or the selected program title may be displayed on the monitor of the media device.

In sum, the present inventions include methods, systems, and user interfaces for presenting information related to available programming to a viewer and for allowing interaction with the viewer.

Therefore, it is an object of the present inventions to satisfy a need for an electronic programming guide that provides a viewer with information such as: (1) the channel or other locator of an available program; (2) the temporal characteristics of an available program such as start time, duration, end time, current availability, etc.; and/or (3) the name, title, or other identifier of an available program.

It is also an object of the present inventions to satisfy a need for an electronic programming guide that provides a viewer with information about the availability of programs of a particular type or related to a specific or specialty topic.

It is an additional object of the present inventions to satisfy a need for an electronic programming guide that provides a viewer with information as to the available programming during a certain time slot or interval as selected by the viewer.

That the present inventions and the exemplary embodiments thereof accomplish the objects of the inventions set forth herein will become apparent from the detailed description that follows.

BRIEF DESCRIPTION OF THE DRAWINGS

FIG. 1 illustrates an exemplary embodiment of a user interface according to the present inventions.

FIG. 2 illustrates another exemplary embodiment of a user interface according to the present inventions.

FIG. 4 illustrates another exemplary embodiment of a user interface according to the present inventions.

DETAILED DESCRIPTION

Figure 3:
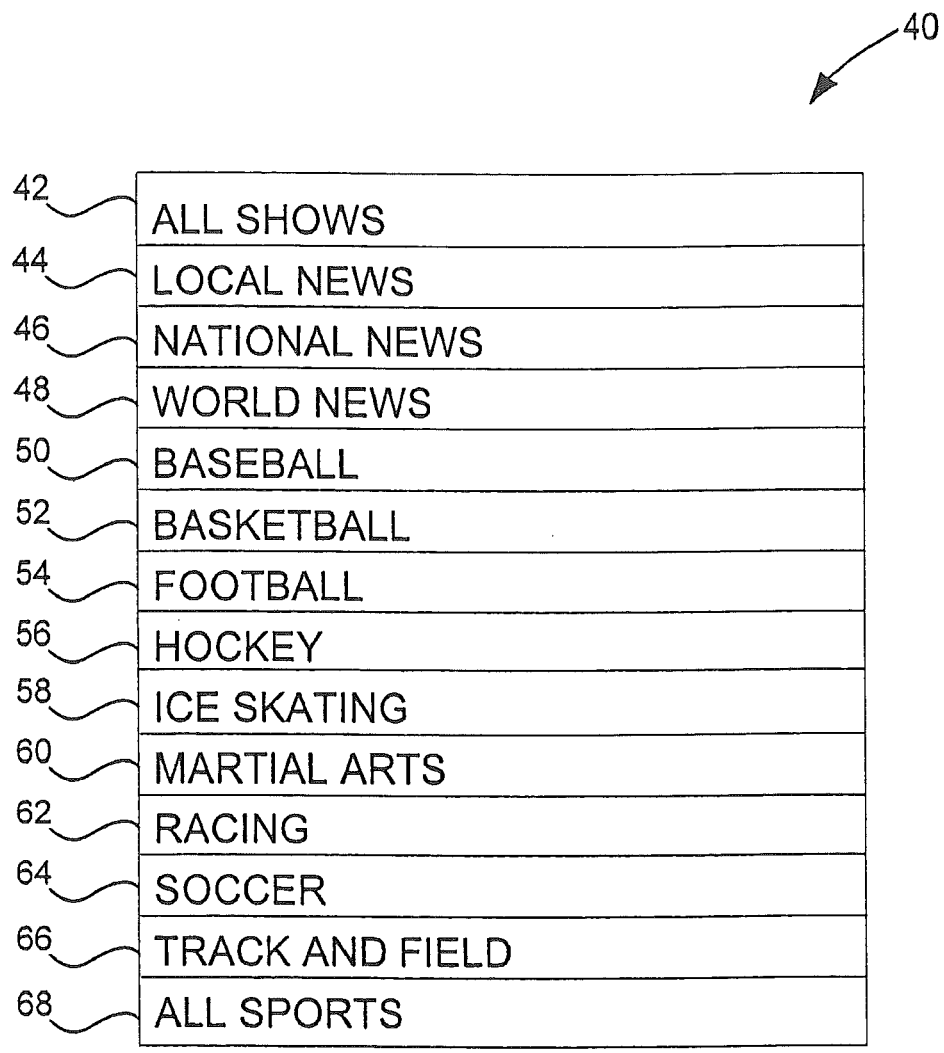
FIG. 3 illustrates yet another exemplary embodiment of a user interface according to the present inventions.

Stated generally, the present inventions include methods, systems, and user interfaces for presenting information related to available programming to a viewer and/or other user. The term "viewer" is used herein to include generally a person who may be reading, watching, viewing, programming, or otherwise interacting with a user interface on a monitor of a media device such as a television monitor, a computer monitor, or the like. In some cases, the viewer may be an entity or other device rather than the person. For example, the viewer may be a computer, another information trans/receiver, or the like.

The exemplary user interfaces including the arrays, topic lists, and specialty topic lists described herein generally possess the characteristics of typical user interfaces as used in televisions, video recorders (VCRs), and in computers and other data devices. The user interfaces may be reviewed and the display of the user interfaces rearranged by being scrolled through (preferably in a vertical direction). The viewer may use any of various up/down controllers such as remote control buttons, scrollbars, on-screen hot-spots, etc. In addition, any one of the user interfaces and separately including the arrays, topic lists, or specialty topic lists may appear on its own screen or display or it may appear with one or more of the other user interfaces, arrays, topic lists, or specialty topic lists. Advantageously, the present inventions allow the viewer to selectively configure and use the user interfaces including the arrays, topic lists, and specialty topic lists of the user interfaces in the most convenient and helpful manner to the viewer.

FIG. 1 illustrates an array 10 that may appear as or as part of a user interface presented on a monitor of a media device (such as television screen or computer screen). The exemplary array 10 provides information as to the channels (or other location indicators), titles, and/or time characteristics of available programming. With respect to television, the information in the array 10 (or any other of the exemplary user interfaces described herein) may be derived from television signals whose source may include a terrestrial antenna, a cable, a satellite, or the like, or from data signals provided through a data network or other computer medium. In particular, the information may be embedded in the vertical blanking interval lines of the television signals and retrieved by a vertical blanking interval decoder of the television. Of course, the information may be delivered in other ways such as by way of tones in the audio signal of the television signals delivered to the television.

When the viewer desires to see a user interface, the viewer may interact directly with the media device (such as through a keypad, mouse, or other input device) or indirectly with the media device through the use of a (infrared) remote control or the like. The viewer inputs the instructions for the display of the user interface. For example, the viewer may use the remote control to call up a particular channel on the television which displays the user interface such as the exemplary array 10 illustrated in FIG. 1. Alternatively, the viewer may select the user interface for display on a monitor from a menu or other options associated with the media device. Further, the viewer may interact with the user interface in a conventional manner through the use of a keypad, mouse, or other input device such as a remote control unit or the like.

An Exemplary Current Show/Next Show Array—FIG. 1

The array 10 of FIG. 1 includes three columns with commonly aligned rows. A first column 12 is referred to as the channel column 12 because each row of the channel column includes a channel indicator. The top row or title row is not considered a row of information related to programming, and is referred to herein separately as a top or title row. For example, the title row 18 includes the term "Channel" in the channel column 12. Every row after the title row 18 includes a channel indicator. In the first row 20 after the title row 18, the channel indicator includes "2-NBC" in the channel column 12. The number of rows may be limited by the amount of programming information available.

In this example, the channel indicator includes two pieces of information: (1) the "2" refers to the channel of this service which carries the programming identified in the corresponding current show and next show columns; and (2) the "NBC" refers to the "National Broadcast Company" which is the service provider (or network) that provides the programming identified in the corresponding current show and next show columns. Both of these pieces of information are included for convenience of the viewer. The channel indicator may include one or the other of these two pieces of information. Alternatively, the channel indicator (also referred to as indicator or locator) may include other terms to convey the identity of the channel or other mechanism of programming transport that carries the programming identified in the corresponding current show and next show columns.

In the array 10 and adjacent to the first column 12 is another column referred to as the current show column 14 because each row (except the top or title row) of the current show column includes a current show title. The current show title names a program available for viewing at the current time on a channel of the media device corresponding to the channel indicator in the commonly aligned row in the channel column 12. For example, the title row 18 includes the term "Current Show" in the column 14. Every row after the title row 18 includes a current show title. In the first row 20 after the title row 18, the current show title is "Batman". In other words, the Batman show is the program that is currently available on channel 2.

Each row of the current show column 14 (except the top or title row) also may include a start time for the program available for viewing at the current time. For example, assume the viewer is viewing the array 10 at 10:20 AM. As illustrated in FIG. 1 in row 20 of the current show column 14, a start time for the Batman show is indicated as 10:00 am. Advantageously, this array 10 provides the viewer with information the Batman show is the currently available programming on channel 2. But the Batman show had a start time of 10:00 AM. From this information, the viewer may deduce the Batman show has been in progress for twenty minutes. The fact the Batman show has been in progress for a certain number of minutes is information that may be useful to the viewer in reaching a programming decision.

In the array 10 and adjacent to the second column 14 is another column referred to as the next show column 16. Each row (except the top or title row) of the next show column includes a next show title. The next show title names a show available for viewing after the currently available program on the channel of the media device corresponding to the channel indicator in the commonly aligned row in the channel column 12. For example, the title row 18 includes the term "Next Show" in the column 16. Every row after the title row 18 includes a next show title. In the first row 20 after the title row 18, the next show title is "Spiderman". In other words, the Spiderman show is the program that follows the Batman show on channel 2.

Each row of the next show column 16 also may include a start time for the next show. For example, assume the viewer is viewing the array 10 at 10:20 AM. As illustrated in FIG. 1 in row 20 of the next show column 16, a start time for the Spiderman show is indicated as 11:00 AM. Advantageously, this array 10 provides the viewer with information the Spiderman show is the next available programming on channel 2. But the Spiderman show has a start time of 11:00 AM. From this information, the viewer may deduce the Spiderman show will come on in forty minutes. The fact that the Spiderman show is scheduled to come on after a certain amount of time is additional information the viewer may use in reaching a decision about programming.

Advantageously, the array 10 of this exemplary user interface provides a viewer with information as to the current programs available (i.e., programs in progress) on the available channels, and as to the next show available on any of these channels. Further, the array 10 may include start times for the current shows and for the next shows. The array 10 is advantageously configured so that whenever the viewer consults the array 10, the array 10 is operative to determine the time (10:20 AM in our example). Based on that time determination, programming information is garnered so that the array 10 displays the current programs available and the next shows available. The start times may vary from row to row in the current show column and the next show column. But time is not the focus of this exemplary array 10. Rather, the focus of this exemplary array 10 is to provide the viewer with information as to the current shows available and the next shows available. If any of these shows catches the viewer's interest, the viewer may tune into or otherwise cause the show of interest to be displayed. If a viewer selects a show that is included in the current shows column, then the viewer need not consult the start time for that selected show because the viewer is assured the selected show is a currently available show. Nevertheless, the viewer may be interested in the start time to see how much of the show he or she may have missed.

In addition, the array 10 of this exemplary user interface allows for a row, a channel indicator, or a current show title to be selected by a viewer. The viewer's selection may be highlighted such as through cross hatching, bolding, coloring, or otherwise differentiating the selection from the other information in the array 10. In addition, the viewer may provide an indication that a currently available program corresponding to a selected (and perhaps highlighted) row, channel indicator, or current show title is to be displayed on the monitor of the media device. In other words, the viewer may choose to view a currently available program based on his or her review of the array 10. The viewer may initiate the display of his or her choice, by selecting a row, a channel indicator, or a current show title on array 10. In response, the selection may be highlighted. In some embodiments, the viewer may otherwise or in addition provide an indication (such as a double-click on a mouse or the like) that he or she desires to view the selected programming on the monitor of the media device. In response to the selection and/or to the indication, the programming is displayed.

An Exemplary Time Slot Array—FIG. 2

As explained above, the focus of the exemplary array 10 in FIG. 1 is on the shows currently available and next available, rather than on time. In contrast, the exemplary time slot array 22 of FIG. 2 is focused on time, and particularly, on time slots during a time period. A viewer may be interested in knowing what is available during a time period such as two hours. The exemplary time slot array 22 presents the viewer with such temporal information by providing the information based on time slots within the time period. Advantageously, the time period may be selected by the viewer, and also, in some embodiments, the duration of the time slots within the time period may be selected by the viewer. Conveniently, the exemplary time slot array 22 illustrates a two hour time period with four time slots of thirty minutes each, which compares well to the format of television programs.

The array 22 of FIG. 2 includes five columns with commonly aligned rows. A first column 24 is referred to as the channel column 24 because each row of the channel column includes a channel indicator. The top row or title row is not considered a row of information related to programming, and is referred to herein separately as a top or title row. The number of rows may be limited by the amount of programming information available.

In this example, as with the array 10 of FIG. 1, the channel indicator includes two pieces of information: (1) the "2" refers to the channel of this service which carries the programming identified in the corresponding current show and next show columns; and (2) the "NBC" refers to the "National Broadcast Company" which is the service provider (or network) that provides the programming identified in the corresponding current show and next show columns. Both of these pieces of information are included for convenience of the viewer. The channel indicator may include one or the other of these two pieces of information. Alternatively, the channel indicator (also referred to as indicator or locator) may include other terms to convey the identity of the channel or other mechanism of programming transport that carries the programming identified in the corresponding current show and next show columns.

In the array 22 and adjacent to the first column 24 is the first time slot column 26 of the four time slot columns 26, 28, 30, 32. As indicated in the top or title row 34 of the first time slot column 26, this column relates to the thirty minute time slot of 10:00-10:30 AM. Each row (except the top or title row) of the first time slot column 26 includes a show title. The show title names a program available for viewing during the 10:00-10:30 AM time slot on a channel of the media device corresponding to the channel indicator in the commonly aligned row in the channel column 24. In the first row 36 after the title row 34, the show title is "Batman".

When more than one program may be available during the time slot, then the program which is available for the most time during the time slot may be named in the show title.

In the time slot array 22 and adjacent to the first time slot column 26 is a second time slot column 28. As indicated in the top or title row 34 of the second time slot column 28, this column relates to the thirty minute time slot of 10:30-11:00 AM. Generally, the time slot columns are arranged in the array 22 such that the earliest time slot is covered by the first time slot column, the next earliest time slot is covered by the second time slot column, which is placed adjacent to the right of the first time slot column. Additional time slot columns are added to the right to cover time slots until the time period is covered.

Referring again to the second time slot column 28, each row (except the top or title row) of the second time slot column 28 includes a show title. The show title names a show available for viewing during the corresponding time slot, i.e., 10:30-11:00 AM on the channel of the media device corresponding to the channel indicator in the commonly aligned row in the channel column 24. In the first row 36 after the title row 34, the show title is "Batman". The reader will note the Batman show also is the show title in the first time slot column 26 in the commonly aligned row. Advantageously, the show title for "Batman" is displayed in the second time slot column 28 as well to provide the viewer with information as to the show available during the second time slot of 10:30-11:00 AM.

The third time slot column 30 and the fourth time slot column 32 are configured in similar fashions to the first time slot column 26 and second time slot column 28 discussed above. Advantageously, the time slot array 22 of this exemplary user interface provides a viewer with information as to the shows or programs available during time slots of a time period.

In addition, the time slot array 22 of this exemplary user interface allows for a row, a channel indicator, or a show title to be selected by a viewer. The viewer's selection may be highlighted such as through cross hatching, bolding, coloring, or otherwise differentiating the selection from the other information in the array 22. In addition, the viewer may provide an indication that a show corresponding to a selected (and perhaps highlighted) row, channel indicator, or show title is to be displayed on the monitor of the media device. In other words, the viewer may choose to view a show program based on his or her review of the array 22. The viewer may initiate the display of his or her choice, by selecting a row, a channel indicator, or a show title on array 22. In response, the selection may be highlighted. In some embodiments, the viewer may otherwise or in addition provide an indication (such as a double-click on a mouse or the like) that he or she desires to view the selected programming on the monitor of the media device. In response to the selection and/or to the indication, the programming is displayed.

An Exemplary Topic List—FIG. 3

The exemplary current show/next show array 10 in FIG. 1 provides a viewer with information as to currently available and next available programming. The exemplary time slot array 22 in FIG. 2 provides a viewer with programming information based on time slots over a time period. Yet, the viewer may be interested in a specific or specialty topic when it comes to his or her viewing preferences. Advantageously, the exemplary topic list 40 adds features that may be used with either the exemplary array 10 or the exemplary time slot array 22 to provide the viewer with topic related programming information.

An exemplary user interface may include an exemplary topic list 40 such as illustrated in FIG. 3. The topic list 40 includes topic entries such as illustrated in FIG. 3 as follows: All Shows 42; Local News 44; National News 46; World News 48; Baseball 50; Basketball 52; Football 54; Hockey 56; Ice Skating 58; Martial Arts 60; Racing 62; Soccer 64; Track and Field 66; All Sports 68; and like topics. A viewer may review the topic list 40 to find a topic entry of interest. If the viewer selects a topic entry, then the selected topic entry may be highlighted on the topic list 40 of the user interface.

Additional effects may result from a topic entry being selected by a viewer from the topic list 40. These additional effects may take place on or with respect to an array(s) that provides the viewer with programming information. Generally, in response to a topic entry being selected by a viewer from the topic list, a channel indicator(s), show title(s) and/or program title(s) in the array and related to the topic of the topic entry are highlighted. This highlighting effectively makes the show titles or program titles related to the topic stand out in the array so that the channel indicator(s), show title(s), and/or program title(s) may be more easily and quickly reviewed by the viewer.

An additional feature of the topic list is a more focused provision of programming information to the viewer. Once the viewer selects a topic entry, the array that provides the viewer with programming information may be configured so the first row of the array contains a highlighted element such as a highlighted channel indicator, show title, and/or program. By including a highlighted element in the first row of the array, the viewer is provided with selected topic information rather than the general programming information provided by the array. In addition, or alternatively, the array may be configured so that the array only includes rows with highlighted elements. By including only the rows with highlighted elements in the array, the viewer is provided with selected topic information that is more focused than the general information.

Yet another feature of the topic list is a more focused process for review of the array. As noted above, the array is configured so the first row of the array contains a highlighted element. When the viewer desires to continue his or her review, the viewer may provide an indication and the next row with a highlighted element moves to the top of the array. Alternatively, the viewer may provide an indication that he or she desires to continue the review, and the next highlighted element in the next row may be differentiated from the other highlighted and non-highlighted elements so as to be quicker and easier to see. Also, the viewer may jump to the next highlighted channel indicator in the array.

Figure 5:
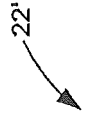
FIG. 5 illustrates another exemplary embodiment of a user interface according to the present inventions.

FIGS. 4 and 5 are exemplary arrays illustrating the effect of a selection of a topic entry by a viewer from a topic list. Assume for these examples that the viewer selected the "All Sports" topic entry 68 from the topic list 40 of FIG. 3. Assume the viewer has selected or been provided with an array that provides him or her current show and next show information similar to the array 10 described in connection with FIG. 1. Also note, as illustrated in FIG. 1, the array 10 includes ten rows with the last six rows having the following channel indicators: 6—CNN 70; 7—ESPN 72; 8—CSPAN 74; 9—MTV 76; 10—HBO 78; and 11—SHOW 80.

Once the viewer selects the "All Sports" topic entry 68 from the topic list 40 of FIG. 3, then the array 10' illustrated in FIG. 4 is configured in several ways. Elements such as the channel indicators, current show titles, and next show titles in the array 10' that are related to the topic of the topic entry are highlighted. The following channel indicators are highlighted in array 10' to indicate the corresponding channels carry programming related to the topic of the topic element selected by the viewer: 6—CNN; 7—ESPN; 10—HBO. The following current show titles are highlighted in array 10' to indicate the corresponding current shows relate to the topic of the topic element selected by the viewer: NASCAR HEROES; and ROCKY XX. The following next show titles are highlighted in array 10' to indicate the corresponding next shows relate to the topic of the topic element selected by the viewer: SPORTS HIGHLIGHTS; and X500 NASCAR PRE-RACE SHOW.

Another way in which the array 10' is configured in response to the selection of the "All Sports" topic entry by the viewer is that the array 10' is changed from the array 10 of FIG. 1 to include only that portion of the array that encompasses the highlighted elements. There are no elements in the first four rows of array 10 that are related to the selected topic entry. The highlighted elements in array 10' are scattered among the last six rows 70', 72', 74', 76', 78', and 80'. Thus, only these last six rows are included in the array 10' based on the selection of the "All Sports" topic entry by the viewer. The clever reader will note that two of the rows (row 74' and row 76') do not include any highlighted elements. In an alternate embodiment, these two rows 74' and 76' also would be deleted from the array 10' so as to only provide the viewer with rows having topic related (i.e., highlighted) elements.

Yet another way in which the array 10' is configured in response to the selection of the "All Sports" topic entry is by the presentation of topic related information in a readily reviewable format. Particularly, the feature provides that the first row that appears in the array include a highlighted element(s). In FIG. 4, the first row 70' that appears in array 10' includes the highlighted elements of 6—CNN and SPORT HIGHLIGHTS. Typically, a viewer reviews an array by first reviewing the first row. By this feature of including as the first row a row that includes highlighted elements, the feature makes the programming information more easy and quick to review.

After the highlighting, the array 10' may be operative to receive an indication from the viewer to view a program having the topic in common with the selected topic entry. In other words, the viewer may select one of the highlighted elements and provide an indication of the selection to the user interface. The array then may cause the program to be displayed on the monitor of the media device.

FIG. 5 includes an exemplary time slot array 22' illustrating the effect of a selection of a topic entry by a viewer from a topic list. As with the array 10' of FIG. 4, the array 22' is configured to highlight the elements in the array related to the topic of the topic entry. In addition, the array 22' is changed from the array 22 of FIG. 2 to include only that portion of the array that encompasses the highlighted elements. There are no elements in the first four rows of array 22 that are related to the selected topic of the topic entry. The last six rows of array 22 include rows 82, 84, 86, 88, 90, and 92. The highlighted elements in array 22' are scattered among the last six rows which appear in FIG. 5 as rows 82', 84', 86', 88', 90', and 92'. Thus, only these last six rows are included in the array 22' based on the selection of the "All Sports" topic entry by the viewer. Also like array 10', the array 22' includes two rows (86' and 88') that do not include highlighted elements. In an alternate embodiment, these two rows 86' and 88' also would be deleted from the array 22'. Further, the array 22' is configured so that the first row 82' includes at least a highlighted entry.

After the highlighting, the array 22' may be operative to receive an indication from the viewer to view a program having the topic in common with the selected topic entry. In other words, the viewer may select one of the highlighted elements and provide an indication of the selection to the user interface. The array then may cause the program to be displayed on the monitor of the media device.

As illustrated herein, the topic list 40 appears separately from either the array 10' of FIG. 4 or the array 22' of FIG. 5. In a user interface, the topic list 40 may appear on a separate screen or separate display from the arrays, but the topic list 40 also may be included on the screen or display with either one or both of the arrays.

Figure 6:
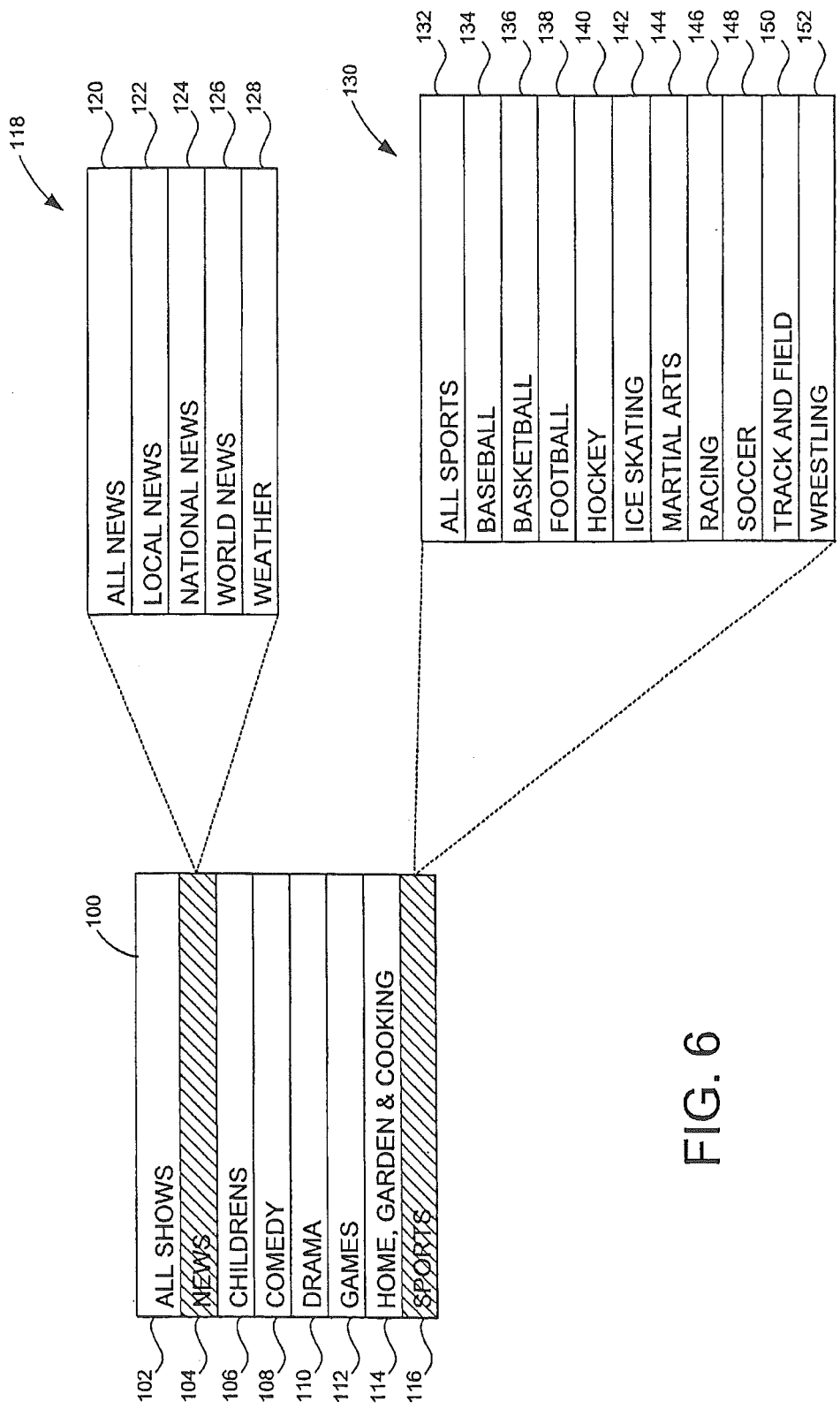
FIG. 6 illustrates another exemplary embodiment of a user interface according to the present inventions.

An Exemplary Specialty Topic List—FIG. 6

The advantageous features of the topic list described in connection with FIG. 3 may be furthered through the use of a specialty topic list that is a list of specialty topics related to one of the topic entries in a topic list. Like the topic list, the specialty topic list may be used with either or both the exemplary array 10 or the exemplary time slot array 22 to provide the viewer with specialty topic related programming information.

FIG. 6 illustrates an exemplary topic list 100. The topic list 100 includes topic entries including: All Shows 102; News 104; Childrens 106; Comedy 108; Drama 110; Games; Home, Garden & Cooking 113; and Sports 116. Each or only selected one(s) of the topic entries may include or correspond to a specialty topic list.

FIG. 6 also illustrates two exemplary specialty topic lists that are related to topic entries in the topic list 100. Specialty topic list 118 is related to topic entry News 104 in the topic list 100. The relationship between the specialty topic list and the topic entry may be based on various factors. A common relationship is a set/subset relationship. For example, the topic entry News 104 may be considered to be a set with the specialty topic entries in the specialty topic list 118 being a subset of the set. The specialty topic list 118 includes the specialty topic entries of All News 120; Local News 122; National News 124; World News 126; and Weather 128.

The other specialty topic list 130 illustrated in FIG. 6 is related to topic entry Sports 116 in the topic list 100. The topic entry Sports 116 may be considered to be a set with the specialty topic entries in the specialty topic list 130 being a subset of the set. The special topic list 130 includes the specialty topic entries of All Sports 132; Baseball 134; Basketball 136; Football 138; Hockey 140; Ice Skating 142; Martial Arts 144; Racing 146; Soccer 148; Track and Field 150; and Wrestling 152. Thus, the viewer may select a topic entry such as Sports 116 from the topic list. In response, the specialty topic list 130 corresponding to the selected topic entry may be displayed. The viewer then may use the specialty topic list 130 as he or she would use a topic list as explained above. For example, a specialty topic entry may be selected as an elected specialty topic entry and that elected specialty topic entry may be highlighted on the user interface. Further, the array providing programming information to the viewer may interact with the topic list and the specialty topic list. For example, the array may respond to the election of an elected specialty topic entry. In particular, the response may be the highlighting in the array of elements such as channel indicators, show titles, and/or program titles a topic in common with the elected specialty topic entry. Further, the array may be operative to receive an indication from the viewer to view the program having the topic in common with the elected specialty topic entry. The array then may cause the program to be displayed on the monitor of the media device.

As illustrated herein, the specialty topic lists 118 and 130 appear connected or otherwise related to the topic list 100. In a user interface, a specialty topic list may appear by itself or with other specialty topic lists on a separate screen or on separate display from the arrays. But the specialty topic list also may be included on the screen or display with either one or both of the arrays and/or with other specialty topic lists and/or topic lists.

Figure 7:
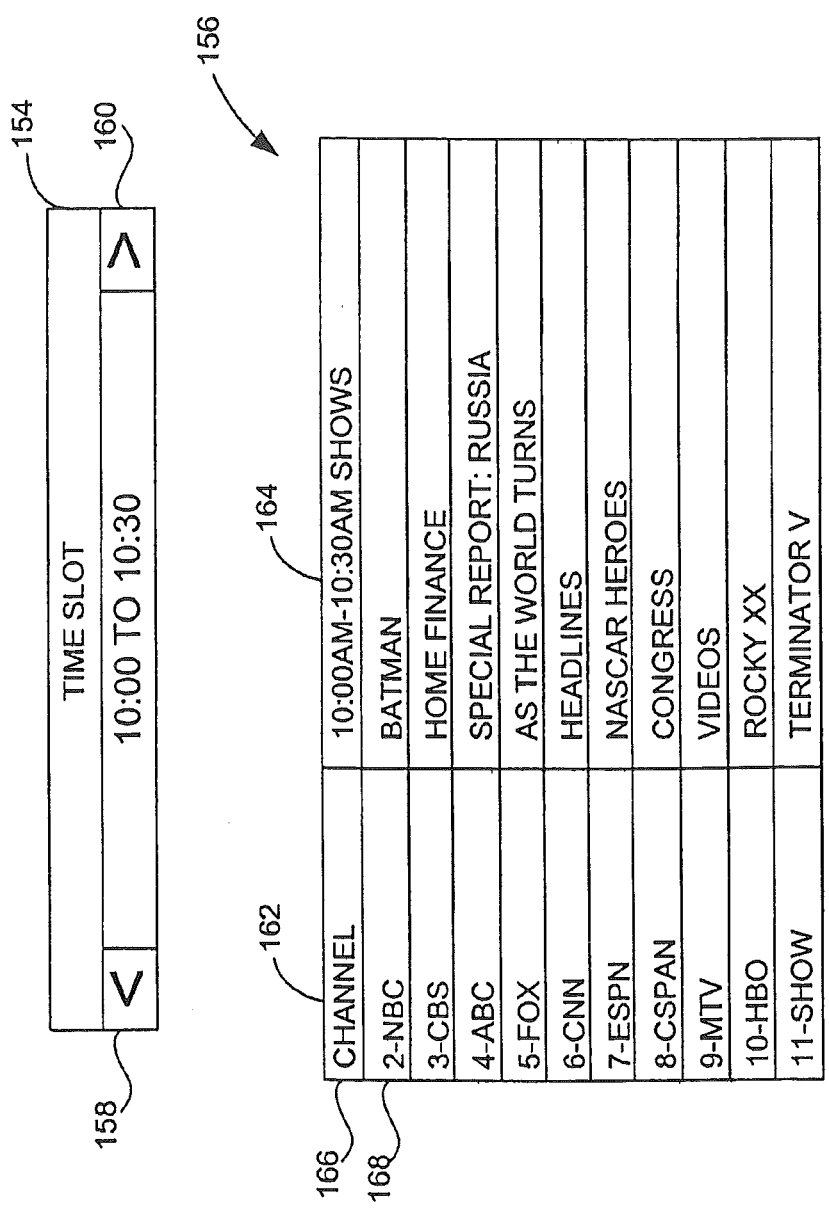
FIG. 7 illustrates another exemplary embodiment of a user interface according to the present inventions.

Single Time Slot and Array—FIG. 7

Advantageously, the present inventions include another exemplary user interface. As illustrated in FIG. 7, this exemplary user interface includes a time slot 154 and an array 156. The programming information in the array 156 presents program titles that are available during the time slot. Other program titles that may be available at other times are not presented. This exemplary user interface may be preferred to more complicated and detailed user interfaces by a viewer who is interested in knowing what is available during a selected time period, and who would like that information presented in as simple and readily understandable manner as possible.

As noted, the exemplary user interface includes a time slot 154 and an array 156. The time slot 154 provides for the display of a time period as may be selected by the viewer such as the 10:00 to 10:30. The illustrated time period is of thirty minutes duration because that time period compares well to the length of television programs. Other durations for the time period in the time slot 154 may be selected.

As noted, the time period may be selected or changed by the viewer. FIG. 7 includes two arrows (left arrow 158, right arrow 160) to facilitate the selection or change in the time period. If the left arrow 158 is selected, the time period becomes increasingly early. For example, 10:00 may be changed with the left arrow 158 to 9:59, then 9:58, etc. In an alternate embodiment, the time period may be changed only in thirty minute increments. So, in the example, the next earlier time period prior to 10:00 would begin at 9:30. The right arrow 160 may be used by the viewer to advance the time period in a similar fashion. Other mechanisms for changing or selecting the time period in the time slot 154 may be used such as a menu, input through keyboard, keypad, infrared remote control, etc.

The array 156 includes two columns (channel column 162 and program column 164) having commonly aligned rows. There is a top or title row 166 in each column, but the top or title row is not considered a row of information and so is referred to herein separately. Each row of the channel column 166 includes a channel indicator as did the rows of the channel columns in the other described arrays of exemplary embodiments. Each row of the program column 164 includes a program title naming a program available for viewing during the selected time period on a channel of the media device corresponding to the channel indicator in a commonly aligned row in the channel column. For example, the first row 160 includes "Batman" as the program title naming the program available for viewing from 10:00-10:30 on Channel 2—NBC.

This exemplary user interface allows a viewer to select a time period, and then, to review the programming that is available on the available channels during that selected time period.

This exemplary user interface allows a viewer to change the time period in the time slot 154. If the time period is changed, then the program title in each row of the program column 1654 may change as necessary to a different program title naming a different program available for viewing during the different selected time period. Of course, a program title in a particular row may not appear to the viewer to change if the same program is available during the different selected time period as well as the originally selected time period.

Further in this exemplary user interface, the array 156 may be receptive to a selection by the viewer of a selected row, a selected channel indicator, or a selected program title. In response, the selected row, the selected channel indicator, or the selected program title may be highlighted. Further, the program corresponding to the selected row, the selected channel indicator, or the selected program title may be displayed on the monitor of the media device. This display may come about through the receipt by the array of an indication from the viewer for such display.

As illustrated herein, the time slot 154 and the array 156 on the same illustration, and so they may appear together on a monitor or screen presenting the user interface. Alternatively, the time slot 154 may appear separately from the array 156.

CONCLUSION

In sum, exemplary embodiments of the present inventions have been described above so as to demonstrate methods, systems, and user interfaces for presenting information related to available programming to a viewer and/or other user. In particular, the descriptions have included user interfaces that provide a viewer with current show/next show information, that provide temporal information based on a time period having time slots, that provide topic and specialty topic information; and that provide programming information based on a single time slot.

The present invention and exemplary embodiments thereof have been explained in detail. Nevertheless, it will be understood that variations and modifications can be effected within the spirit and scope of the invention as described hereinabove and as defined in the appended claims.

We claim:

1. A method for providing a user interface including information about shows available for viewing, the method comprising:

acquiring, from a network source, digital signals corresponding to programming;

deriving programming information from the digital signals, displaying, on a monitor of a media device via the user interface, an array including three columns having commonly aligned rows, the array containing the programming information from the digital signals;

the three columns comprising a channel column, a current show column, and a next show column;

each row of the channel column comprising a channel indicator;

each row of the current show column comprising a current show title, the current show title naming a current show available for viewing at a current time on a channel corresponding to the channel indicator in a commonly aligned row in the channel column;

each row of the next show column comprising a next show title, the next show title naming a next show available for viewing after the current show available for viewing at the current time on the channel corresponding to the channel indicator in the commonly aligned row in the channel column, irrespective of the start time of the next show relative to the current show; and in response to receiving a selection of a channel via the user interface, displaying on the monitor programming corresponding to the selection.

2. The method of claim 1, wherein the array is receptive to a selection, by a viewer via an electronic control device, of the commonly aligned row as a selected row, and in response to the selection via the electronic control device, the array is operative to cause the selected row to be highlighted.

3. The method of claim 2, wherein the selected row comprises a selected current show title in the current show column, the selected current show title naming a selected current show available for viewing at the current time; and wherein the array is further operative, in response to the selection, to cause the selected current show to be displayed on the monitor of the media device.

4. The method of claim 1, wherein the array is receptive to a selection of the current show title of the commonly aligned row as a selected current show title, and in response to the selection, the array is operative to cause the selected current show title to be highlighted.

5. The method of claim 4, wherein the selected current show title corresponds to a selected current show available for viewing at the current time; and wherein the array is further operative, in response to the selection, to cause the selected current show to be displayed on the monitor of the media device.

6. The method of claim 1, further comprising:

providing a topic list having topic entries, the topic list being receptive to a selection of a topic entry as a selected topic entry; and in response to the selection, the topic list being operative to highlight the selected topic entry via the interface.

7. The method of claim 6, wherein the array is operative, in response to the selection of the selected topic entry from the topic list, to cause the highlighting of a current show title in the current show column, the current show title naming a current show having a topic in common with the selected topic entry from the topic list.

8. The method of claim 6, wherein the array is operative, in response to the selection of the selected topic entry from the topic list, to cause the highlighting of a next show title in the next show column as a highlighted next show title, the highlighted next show title naming a next show having a topic in common with the selected topic entry from the topic list.

9. The method of claim 7, wherein the array is further operative, in response to the highlighting, to receive an indication to view the current show having the topic in common with the selected topic entry from the topic list, and to cause the current show having the topic in common with the selected topic entry to be displayed.

10. A method for presentation of a user interface with information about shows available for viewing in response to an indication of a specialty topic interest, the method comprising:

acquiring, from a network source, digital signals corresponding to programming;

deriving programming information from the digital signals;

displaying the user interface on a monitor of a media device, the user interface including:

a topic list having topic entries, the topic list comprising:
a topic entry of the topic list comprising a specialty topic list, the specialty topic list comprising specialty topic entries, the specialty topic entries of the specialty topic list being related to the topic entry of the topic list, the topic list being receptive to a selection of the topic entry as a selected topic entry, and in response to the selection, the topic list being operative to cause display of the specialty topic list on the monitor, and the specialty topic list being receptive to an election of a specialty topic entry from the specialty topic entries of the specialty topic list as an elected specialty topic entry;

an array containing the programming information from the digital signals, the array comprising:

three columns having commonly aligned rows, the three columns comprising a channel column, a current show column, and a next show column, each row of the channel column comprising a channel indicator, each row of the current show column comprising a current show title, the current show title naming a current show available for viewing at the current time on a channel corresponding to the channel indicator in a commonly aligned row in the channel column, each row of the next show column comprising a next show title, the next show title naming a next show available for viewing after the current show available for viewing at the current time on the channel corresponding to the channel indicator in the commonly aligned row in the channel column irrespective of the start time of the next show relative to the current show.

11. The method of claim 10, wherein the array is operative, in response to the election of the elected specialty topic entry from the specialty topic list, to cause highlighting of a current show title, on the monitor of the media device, as a highlighted current show title in the current show column, the highlighted current show title naming a current show having a topic in common with the elected specialty topic entry of the specialty topic list.

12. The method of claim 11, wherein the array is operative to receive an indication to view the current show having the topic in common with the elected specialty topic entry of the topic list, and to cause the current show having the topic in common with the elected specialty topic entry to be displayed.

13. The method of claim 10, wherein the array is receptive to a selection of a commonly aligned row as a selected row, and in response to the selection, the array is operative to cause the selected row to be highlighted.

14. The method of claim 13, wherein the selected row comprises a selected current show title in the current show column, the selected current show title naming a selected current show available for viewing at the current time; and wherein the array is further operative, in response to the selection, to cause the selected current show to be displayed.

15. The method of claim 10, wherein the array is receptive to a selection of the current show title of one of the commonly aligned rows, as a selected current show title, and in response to the selection, the array is operative to cause the selected current show title to be highlighted.

16. The method of claim 15, wherein the selected current show title corresponds to a selected current show available for viewing at the current time; and wherein the array is further operative, in response to the selection, to cause the selected current show to be displayed.

17. The method of claim 1, wherein the network source includes at least one of a terrestrial antenna, a cable, and a satellite, and the information is embedded in vertical blanking interval lines of the digital signals and retrieved by a vertical blanking interval decoder.

18. The method of claim 1, wherein the media device is a television.

19. The method of claim 10, wherein the network source includes at least one of a terrestrial antenna, a cable, and a satellite, and the information is embedded in vertical blanking interval lines of the digital signals and retrieved by a vertical blanking interval decoder.

20. The method of claim 19, wherein the media device is a television.

* * * * *